(12) United States Patent
Lhuillier et al.

(10) Patent No.: US 9,528,605 B2
(45) Date of Patent: Dec. 27, 2016

(54) PLASTIC PRIMARY PISTON WITH STAMPED SHEET-METAL FUNCTIONAL INSERT FOR PENETRATION-TYPE TANDEM MASTER CYLINDER AND MASTER CYLINDER EQUIPPED WITH SUCH A PISTON

(75) Inventors: Laurent Lhuillier, Le Blanc Mesnil (FR); Daniel Grech, Lamorlaye (FR); Olivier Bernadat, Le Perreux (FR); Marc Rodriguez, Beverly Hills, MI (US)

(73) Assignee: Robert Bosch GMBH, Stuttgart (DE)

( * ) Notice: Subject to any disclaimer, the term of this patent is extended or adjusted under 35 U.S.C. 154(b) by 562 days.

(21) Appl. No.: 13/995,379

(22) PCT Filed: Dec. 6, 2011

(86) PCT No.: PCT/EP2011/071942
§ 371 (c)(1),
(2), (4) Date: Jan. 2, 2014

(87) PCT Pub. No.: WO2012/084500
PCT Pub. Date: Jun. 28, 2012

(65) Prior Publication Data
US 2014/0109765 A1 Apr. 24, 2014

(30) Foreign Application Priority Data

Dec. 21, 2010 (FR) ...................................... 10 05012

(51) Int. Cl.
*B60T 11/20* (2006.01)
*F16J 1/01* (2006.01)
*B60T 11/18* (2006.01)
*B60T 11/236* (2006.01)

(52) U.S. Cl.
CPC ........ *F16J 1/01* (2013.01); *B60T 11/18* (2013.01); *B60T 11/20* (2013.01); *B60T 11/236* (2013.01)

(58) Field of Classification Search
CPC ..................................... B60T 11/20; F16J 1/22
See application file for complete search history.

(56) References Cited

U.S. PATENT DOCUMENTS

| | | | |
|---|---|---|---|
| 4,510,752 A * | 4/1985 | Gaiser ............................. | 60/562 |
| 4,831,916 A * | 5/1989 | Leigh-Monstevens et al. .............................. | 92/129 |
| 4,914,916 A * | 4/1990 | Leigh-Monstevens et al. .............................. | 60/534 |

(Continued)

FOREIGN PATENT DOCUMENTS

| | | |
|---|---|---|
| CN | 1425546 | 6/2003 |
| DE | 101 30 542 | 8/2002 |

(Continued)

OTHER PUBLICATIONS

International Search Report for PCT/EP2011/071942, dated Mar. 29, 2012.

*Primary Examiner* — F. Daniel Lopez
(74) *Attorney, Agent, or Firm* — Norton Rose Fulbright US LLP; Gerard Messina

(57) ABSTRACT

A master cylinder includes at least one primary piston and one secondary piston installed in the bore hole of the master cylinder, which pistons are used to create pressure. The primary piston has a body of molded plastic material and is equipped with a functional metallic insert which has the shape of a spherical cap capable of accommodating a push rod.

8 Claims, 3 Drawing Sheets

(56) References Cited

U.S. PATENT DOCUMENTS

| | | | |
|---|---|---|---|
| 6,769,254 B2* | 8/2004 | Heller et al. ............... | 60/589 |
| 6,854,271 B2* | 2/2005 | Koberstein et al. .......... | 60/588 |
| 2003/0075397 A1 | 4/2003 | Gravier | |
| 2005/0166753 A1 | 8/2005 | Nolan et al. | |
| 2007/0187200 A1 | 8/2007 | Gravier | |

FOREIGN PATENT DOCUMENTS

| | | |
|---|---|---|
| EP | 1 072 381 | 1/2001 |
| EP | 1 403 160 | 3/2004 |
| EP | 1 559 933 | 8/2005 |
| FR | 2 651 838 | 3/1991 |
| FR | 2 788 095 | 7/2000 |
| FR | 2 827 244 | 1/2003 |
| GB | 2235961 | 3/1991 |
| JP | 2000089272 | 3/2000 |
| JP | 03058878 | 4/2000 |
| JP | 2004076960 | 3/2004 |
| WO | WO 00/40871 | 7/2000 |

\* cited by examiner

PLASTIC PRIMARY PISTON WITH STAMPED SHEET-METAL FUNCTIONAL INSERT FOR PENETRATION-TYPE TANDEM MASTER CYLINDER AND MASTER CYLINDER EQUIPPED WITH SUCH A PISTON

BACKGROUND OF THE INVENTION

1. Field of the Invention

The invention relates to a master cylinder primary piston for an automotive vehicle and to vehicle master cylinders equipped with such a piston.

2. Description of the Related Art

Master cylinders known to the state of the art have a primary piston and a secondary piston, generally made of aluminum, both of which are mounted in series along an axial bore in the body of a brake master cylinder, generally made of machined aluminum. Such a master cylinder is described in French patent FR 2,827,244 or U.S. Pat. No. 4,831,916. A push rod is used to actuate the movement of the primary piston. The role of the primary piston is to pressurize a primary pressure chamber and the role of the secondary piston is to pressurize a secondary pressure chamber. Primary and secondary springs tend to push the pistons in the direction opposite this movement, thereby ensuring the increase in pressure.

The master-cylinder bore hole is supplied with brake fluid from two supply access holes that are connected to a brake fluid reservoir. The supply access holes are used to supply the primary and secondary pressure chambers. These holes emerge into annular chambers, annular seals known as cups are provided on either side of the annular chambers.

Brake fluid is supplied to the pressure chambers when the pistons are at rest. The pistons are then in the position shown in FIG. 1. Supply takes place by means of passages provided in the walls of the pistons, which promote communication between the supply access holes and annular chambers and the interior of the primary and secondary pistons, culminating respectively in primary and secondary pressure chambers. Whenever the pistons are axially moved forward, which is the direction of arrow D in FIG. 1, the piston passages cross the seals, thereby isolating the supply chambers and allowing a brake pressure to be established in the primary and secondary pressure chambers.

The master-cylinder assembly is capable of being mounted on a brake-assist servomotor.

Whenever the pistons are moved in the direction of arrow D by the push rod that exerts a selective pressure on the primary piston, cup 4 isolates the primary pressure chamber from the primary access supply hole and cup 6 isolates the secondary pressure chamber from the supply access hole. Whenever the force on the push rod is relaxed, the volume of brake fluid accumulated in the brakes and springs of the master cylinder push the pistons back into rest position. It can happen that, when the push rod is quickly released, the brake fluid contained in the master-cylinder pressure chambers drops below atmospheric pressure due to the action of the primary and secondary springs, which repulse the pistons more rapidly than the flow capacity of the brake fluid in the master cylinder. When the pistons reach rest position, communication between the reservoir at atmospheric pressure and the chambers of the master cylinder is directly established, and there occurs a sudden flow of brake fluid, which generates a noise in the master cylinder known as a "fluid hammer."

To improve the performance of master cylinders, it is necessary to provide aluminum master-cylinder pistons with specific shapes, which shapes can entail significant additional costs due to the complexity of their manufacture.

BRIEF SUMMARY OF THE INVENTION

An object of the present invention is to provide a primary piston made of plastic that is simple to produce, economical, and capable of resisting the mechanical forces for a brake master cylinder.

The present invention provides a master-cylinder piston installed in a brake master cylinder of the type described above, comprising at least one primary piston and one secondary piston mounted in a bore hole of the master cylinder. These pistons allow a pressure to be created in a primary pressure chamber and a secondary pressure chamber, respectively, by the action of a push rod on the primary piston, characterized in that the primary piston is of molded plastic material and equipped with an overmolded metal insert of stamped sheet metal situated between a front cavity of the primary piston and a receiving cavity of the push rod, where the push rod exercises a force to displace the primary piston and generate a pressure in the master cylinder and the said insert has the shape of a spherical cap capable of accommodating, on the one hand, the push rod and, on the other hand, a shape enabling the centering of the primary spring or the centering of a primary spring pack. The primary piston is preferably made of a thermoset plastic and, more preferably, of phenolic resin filled with glass fibers. The primary spring pack is composed of two spring ends, for a rod and for the primary spring.

The overmolding enables a seal to be created between the insert and the body of the primary piston. The specific shape and hardness of said stamped sheet metal insert is used to accommodate the push rod and resist push-rod deformation.

The plastic body of the piston with the metallic insert confers increased mechanical resistance upon the primary piston and enables the thickness of plastic materials to be reduced and the primary piston to be more compact.

Another beneficial characteristic is that the body of the primary piston is easily made by injection molding, which allows complex shapes to be produced, such as grooves, ribs, non-cylindrical holes.

According to another beneficial characteristic, the body of the piston is easily made by injection molding and the primary piston leaving the mold is ready for assembly without requiring any finishing work, unlike the aluminum piston, which requires additional machining.

According to another beneficial characteristic, the body of the piston is easily made by molding thermoset plastic materials, which allow the surface to be ground by machining to improve the reliability of the master cylinder.

According to another beneficial characteristic, the body of the piston is easily made by injection molding plastic materials, which allow noises caused by the brake fluid (fluid hammer) to be damped.

According to another beneficial characteristic, the insert is made of magnetizable material so that the piston emits a magnetic field capable of being detected by a magnetic-field sensor.

According to another beneficial characteristic, the shape allows the spring to be centered and also allows the insert to be maintained in the mold before the injection of the plastic material.

The thickness of the insert is designed to resist a test pressure of 40 MPa, this thickness taking into account the diameter of the primary piston and the bearing section of the push rod.

DETAILED DESCRIPTION OF THE DRAWINGS

DETAILED DESCRIPTION OF THE INVENTION

Figure 1:
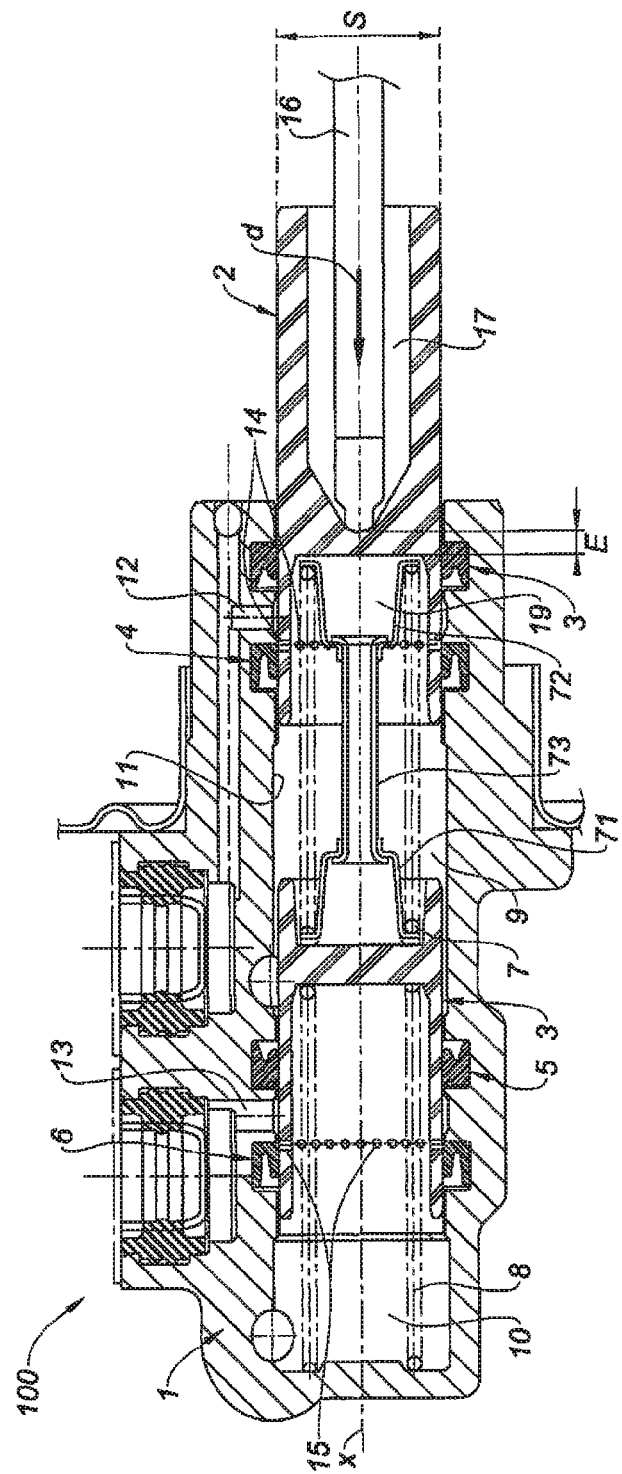
FIG. 1 is an axial cutaway view of a master cylinder known to the state of the art and previously described.

In FIG. 1, therefore, we find brake master cylinder 100 having bore hole 11 in which primary piston 2 and secondary piston 3 and primary spring 7 and secondary spring 8 have been placed. Pistons 2 and 3 serve to pressurize, respectively, primary pressure chamber 9 and secondary pressure chamber 10, brake fluid supply access hole 12 and brake fluid supply access hole 13, which are intended to be connected to a brake fluid reservoir (not shown). On either side of access hole 12, cups 3 and 4 are provided and, on either side of access hole 13, cups 5 and 6 are provided. Whenever the master cylinder is at rest, the primary piston is in the position shown in FIG. 1. The piston walls [are] equipped with passages 14 and 15 and enable holes 12 and 13 to communicate with the interior of the pistons and primary pressure chambers 9 and secondary pressure chamber 8. When at rest, cups 4 and 6 allow communication between access holes 12 and 13 [and] primary [and] secondary pressure chambers 9 and 8, these then being supplied with brake fluid.

Whenever, under the effect of a braking force exercised in direction D by push rod 16 placed in cavity 17 of primary piston 2, primary piston 2 is moved in the direction of arrow D, cup 6 blocks hole-shaped passages 15 and cup 4 blocks passages 14. Because primary and secondary pressure chambers are thereby isolated from holes 12 and 13, a pressure is established in chambers 9 and 10, this pressure being proportional to the force exercised in direction D by push rod 16 placed in cavity 17 of primary piston 2. The external diameter S of primary piston 2 forms a section on which the pressure of the primary chamber acts. In cavity 17 of the primary piston, push rod 16 applies a force to generate a pressure in the master cylinder but on a diameter that is appreciably smaller, at a minimum 4 times smaller. This creates significant stress at the primary piston, primarily near the wall separating cavities 17 and 19, which, therefore, requires a minimum thickness of material E between the receiving cavity of push rod 17 and forward cavity 19, where a primary spring pack is found, consisting of two spring ends 71, 72, rod 73, and primary spring 7.

Figure 2:
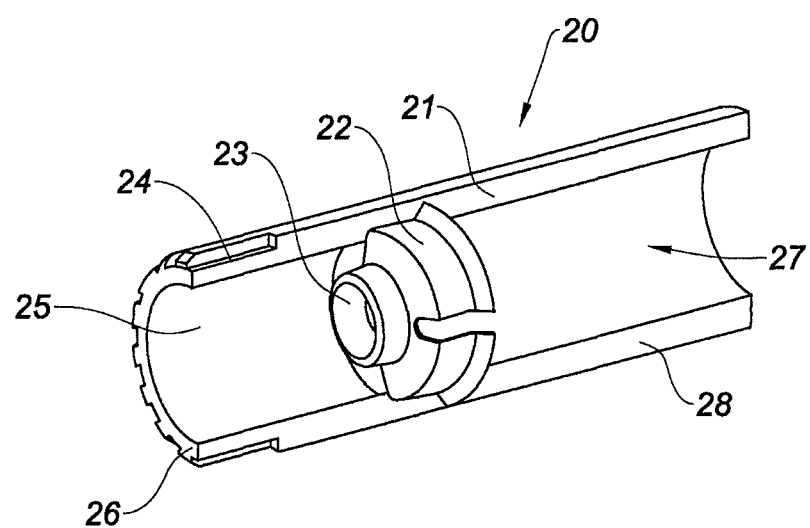
FIG. 2 is an isometric view with a partial cutaway of an embodiment of a master-cylinder piston according to the invention, with grooves on the front of the piston.
Figure 3:
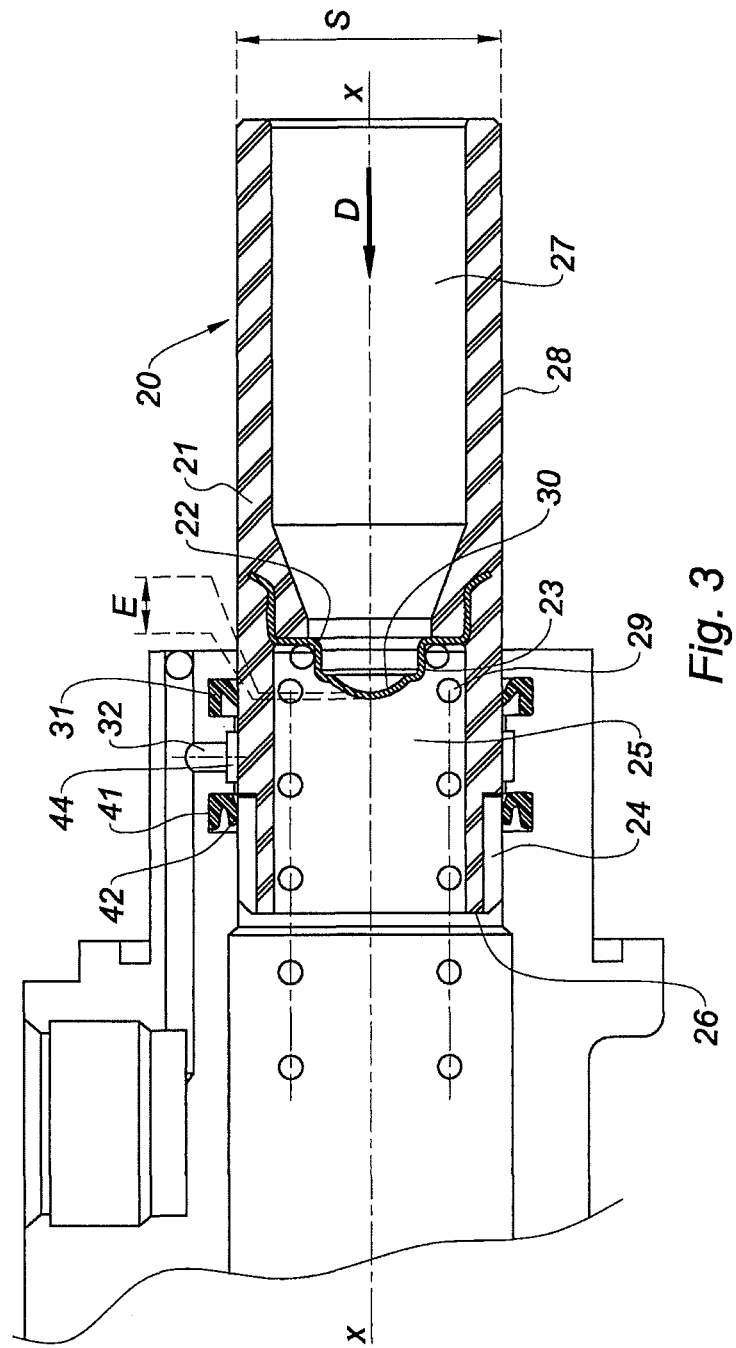
FIG. 3 is a partial axial view of an embodiment of a portion of a master cylinder according to the invention.

FIGS. 2 and 3 show master-cylinder primary piston 20, characterized in that primary piston 20 is of molded plastic material and equipped with a metallic insert 20 of overmolded stamped sheet metal situated between forward cavity 25 of the primary piston and a receiving cavity of push rod 27, where a push rod, not shown, is found, which is capable of exerting a force to move the primary piston and generate pressure in the master cylinder, and wherein a portion of the said insert has the shape 23 of spherical cap 30 capable of accommodating the push rod. The shape of the remaining portion of the insert adjacent to the spherical cap centers primary spring 29 or centers the primary spring pack, and wherein the piston has at least one groove 24. The overmolding allows for mechanically binding and sealing the two parts of the primary piston, insert 22 and body 21. The seal between insert 22 and body 21 is realized by overmolding body 21 on insert 22. During braking applications, a deformation of the push rod on the primary piston occurs; the specific shape and hardness of said insert of stamped sheet metal is capable of accommodating the push rod and resisting deformation.

Grooves 24 are of sufficient length so that, when the master cylinder is at rest, the grooves allow brake fluid to pass beneath A seal point 42 of cup 41 and emerge in annular chamber 44 situated between cups 31 and 41. These grooves form passages between the pressure chamber and annular chamber 44 connected to the reservoir by a hole 32. It would have been possible to realize grooves 24 of aluminum but this would have resulted in significant additional costs. The use of plastic materials helps to reduce costs because the shapes of the grooves can be planned during molding. The use of those same plastic materials necessitates increasing thicknesses and using more material to overcome the difference in the mechanical resistance of the materials. The plastic body and metallic insert confer upon the primary piston an increased mechanical resistance and allow thickness E to be reduced, E being the thickness of the sheet metal used to fabricate the insert in the invention.

The shape of insert 22 enables the pressure point of the push rod in the primary piston to be shifted further forward in primary piston 20, making the piston more compact; additionally, the installation of the insert between forward cavity 25 and cavity 27, provides the mechanical resistance of aluminum together with the advantages of the ease of manufacture of complex shapes such as grooves through the use of plastic materials that can be molded. Moreover, the compactness of the primary piston also allows the master cylinder to be more compact and results in savings on master-cylinder materials.

Another advantageous characteristic is that body 21 of piston 20 is easily made by injection molding, which allows for the realization of complex shapes such as grooves 24.

According to another advantageous characteristic, body 21 of the piston is easily made by molding thermoset plastic materials, which allows surface 28 to be ground by machine to improve the reliability of the master cylinder.

According to another advantageous characteristic, the shape of spherical cap 30, capable of accommodating the push rod, is found inside the first coils of primary spring 29.

Another advantageous characteristic is that insert 22 of primary piston 20 is made of magnetizable material so that the piston emits a magnetic field capable of being detected by a magnetic field sensor.

REFERENCE KEY 1 body
2 primary piston
3 secondary piston
4 cup
5 cup
6 cup
7 spring
8 spring
9 secondary pressure chamber
10 primary pressure chamber
11 bore hole 12 hole
13 hole
14 grooves
15 holes
16 push rod
17 primary piston cavity
18 cup
19 forward cavity
20 primary piston according to the invention
21 piston body
22 insert
23 spring centerer
24 groove
25 forward cavity
26 front face of piston
27 push rod receiving cavity
28 piston surface
29 primary spring
30 push rod seat
31 cup
32 hole
41 cup
42 seal point
44 annular chamber
71 primary spring pack end
72 primary spring pack end
73 primary spring pack rod
100 tandem master cylinder
E thickness of material between the two cavities
S piston diameter
X master cylinder axis

The invention claimed is:

1. A primary piston for a penetration-type tandem master cylinder, comprising:
a primary piston body formed by molded plastic material; and
a metallic insert of overmolded stamped sheet metal located between a forward cavity of the primary piston body and a receiving cavity of a push rod, wherein a portion of the metallic insert is a part-spherical cap having a convex contour with respect to a remaining portion of the insert that curves outwardly away from an interior of the insert, wherein the part-spherical cap is configured to accommodate the push rod, and wherein a contour of the remaining portion of the insert centers a primary spring or a primary spring pack.

2. The primary piston according to claim 1, wherein the primary piston body is made of a thermoset plastic material.

3. The primary piston according to claim 2, wherein the part-spherical cap is configured to fit inside a first coil of the primary spring.

4. The primary piston according to claim 1, wherein the primary piston is made of a noise-damping plastic material.

5. The primary piston as recited in claim 1, wherein:
the insert includes a first end that is open and sized to receive the push rod,
the part-spherical cap is located at a second end of the insert that is opposite the first end, and
the part-spherical cap includes a surface facing the interior of the insert for contacting the push rod.

6. A master cylinder, comprising:
at least a primary piston; and
a secondary piston mounted in a bore hole of the master cylinder;
wherein the primary piston is made of molded plastic material and equipped with a metallic insert of overmolded stamped sheet metal located between a forward cavity of the primary piston and a receiving cavity of a push rod, and wherein the metallic insert is a part-spherical cap having a convex contour with respect to a remaining portion of the insert that curves outwardly away from an interior of the insert, wherein the part-spherical cap is configured to accommodate the push rod, and wherein a contour of the remaining portion of the insert centers a primary spring or a primary spring pack.

7. The master cylinder according to claim 6, wherein the metallic insert of the primary piston is made of a magnetizable material which emits a magnetic field capable of being detected by a magnetic field sensor.

8. The master cylinder as recited in claim 6, wherein:
the insert includes a first end that is open and sized to receive the push rod,
the part-spherical cap is located at a second end of the insert that is opposite the first end, and
the part-spherical cap includes a surface facing the interior of the insert for contacting the push rod.

* * * * *